(12) United States Patent
Ohse et al.

(10) Patent No.: US 11,940,078 B2
(45) Date of Patent: Mar. 26, 2024

(54) MODULAR HEATER ASSEMBLIES FOR USE IN FLUID CONDUITS

(71) Applicant: Watlow Electric Manufacturing Company, St. Louis, MO (US)

(72) Inventors: Jeremy Ohse, St. Louis, MO (US); Eric Ellis, Columbia, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 340 days.

(21) Appl. No.: 17/346,465

(22) Filed: Jun. 14, 2021

(65) Prior Publication Data

US 2021/0388934 A1 Dec. 16, 2021

Related U.S. Application Data

(60) Provisional application No. 63/038,420, filed on Jun. 12, 2020.

(51) Int. Cl.
*F16L 53/00* (2018.01)
*F16L 53/38* (2018.01)
(Continued)

(52) U.S. Cl.
CPC ............. *F16L 53/38* (2018.01); *F16L 59/022* (2013.01); *F16L 59/147* (2013.01)

(58) Field of Classification Search
CPC ........ F16L 53/38; F16L 59/022; F16L 59/147
(Continued)

(56) References Cited

U.S. PATENT DOCUMENTS 2,894,538 A * 7/1959 Wilson ................... F16L 59/166
285/423
3,556,158 A * 1/1971 Schneider ............. F16L 59/161
285/47

(Continued)

FOREIGN PATENT DOCUMENTS

WO 2007019564 A2 2/2007

OTHER PUBLICATIONS

International Search Report from corresponding International Application No. PCT/US2021/037174, dated Oct. 5, 2021, 10 pages.
(Continued)

*Primary Examiner* — James F Hook
(74) *Attorney, Agent, or Firm* — Burris Law, PLLC

(57) ABSTRACT

A modular heater assembly includes resistive heaters disposed along sections of a fluid conduit system, insulation members around the resistive heaters, and at least one insulation block around a fitting. The fitting is configured to join at least two adjacent sections of the fluid conduit system and defines an exterior geometric profile. The insulation block includes a central recess extending axially in a direction of one of the at least two adjacent sections and defining an internal geometric profile substantially matching the external geometric profile of the fitting, and a peripheral aperture. The peripheral aperture is open to the central recess, defines an internal geometric profile substantially matching an external geometric profile of another of the at least two adjacent sections, extends through a sidewall of the insulation block, and is axially aligned with the another of the at least two adjacent sections.

22 Claims, 11 Drawing Sheets

(51) Int. Cl.
*F16L 59/02* (2006.01)
*F16L 59/147* (2006.01)

(58) Field of Classification Search
USPC .............................. 138/149, 33, 110, 155, 99
See application file for complete search history.

(56) References Cited

U.S. PATENT DOCUMENTS

| | | | | |
|---|---|---|---|---|
| 3,628,572 | A * | 12/1971 | Shannon | F16L 59/024 |
| | | | | 138/156 |
| 4,046,406 | A * | 9/1977 | Press | F16L 59/161 |
| | | | | 285/55 |
| 4,281,238 | A * | 7/1981 | Noma | H05B 3/58 |
| | | | | 219/535 |
| 4,553,023 | A * | 11/1985 | Jameson | F16L 53/38 |
| | | | | 137/341 |
| 5,632,919 | A * | 5/1997 | MacCracken | H01J 37/3244 |
| | | | | 219/535 |
| 5,714,738 | A | 2/1998 | Hauschulz et al. | |
| 6,220,302 | B1 * | 4/2001 | Nolley | F16L 55/103 |
| | | | | 139/97 |
| 6,237,640 | B1 * | 5/2001 | Vanderlee | B29C 65/342 |
| | | | | 138/92 |
| 2007/0045275 | A1 | 3/2007 | Steinhauser et al. | |
| 2007/0119848 | A1 * | 5/2007 | Ellis | F16L 53/38 |
| | | | | 219/541 |
| 2007/0205004 | A1 * | 9/2007 | Perkovich | B26D 3/169 |
| | | | | 138/155 |

OTHER PUBLICATIONS

1 Office Action issued in corresponding CN Application 202190000534. 8, dated Apr. 21, 2023, 3 pages.

* cited by examiner

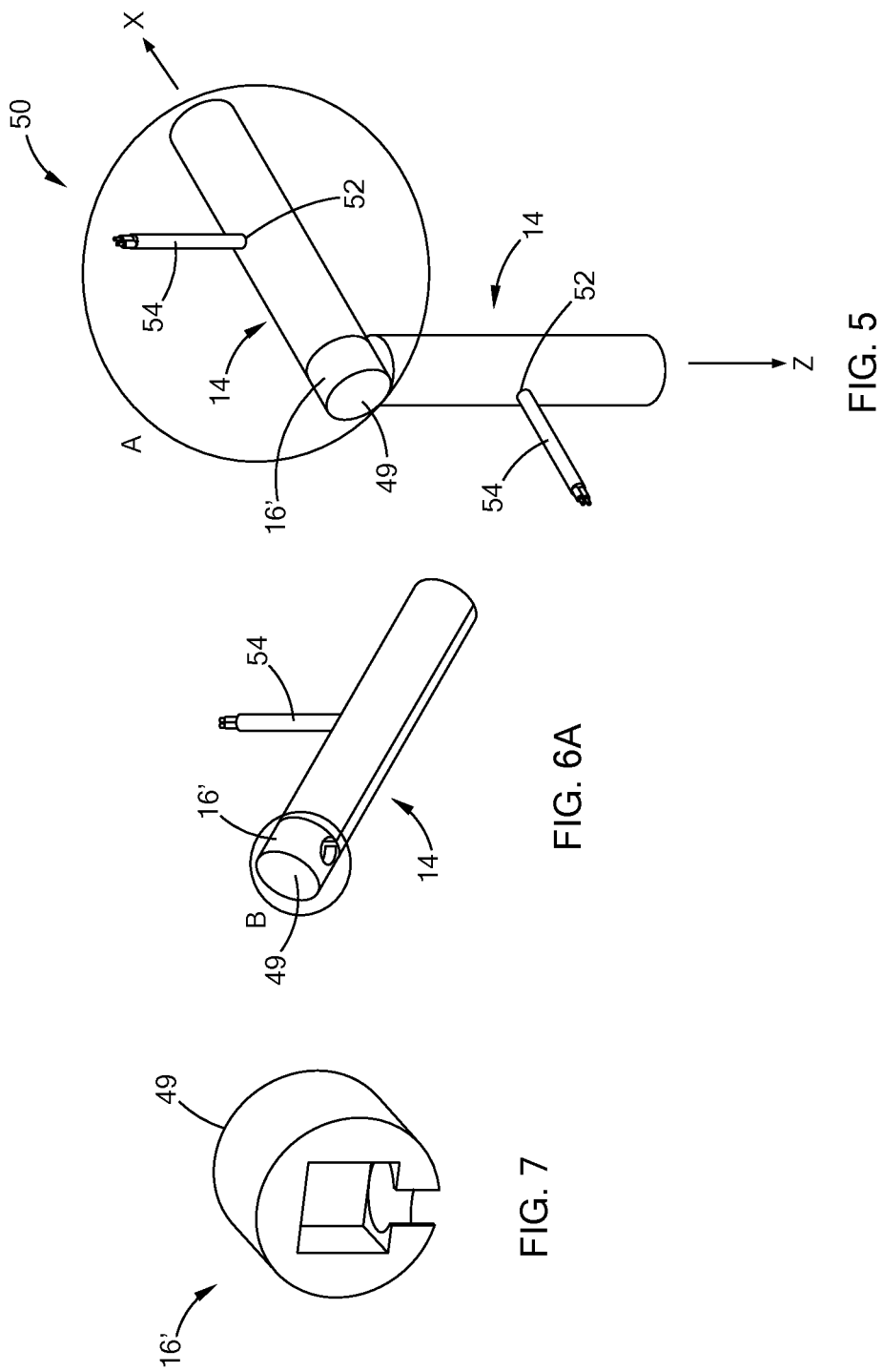

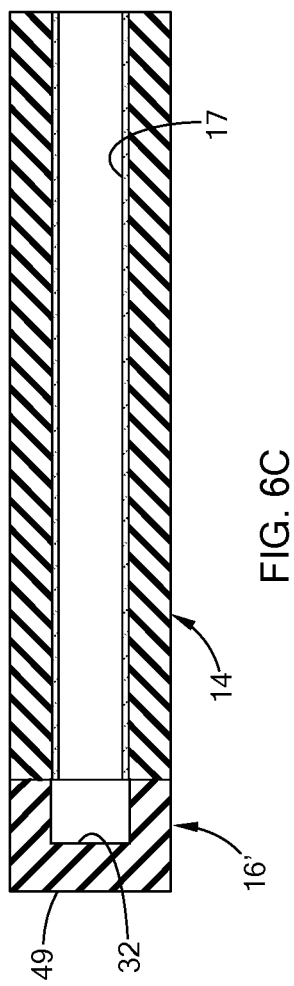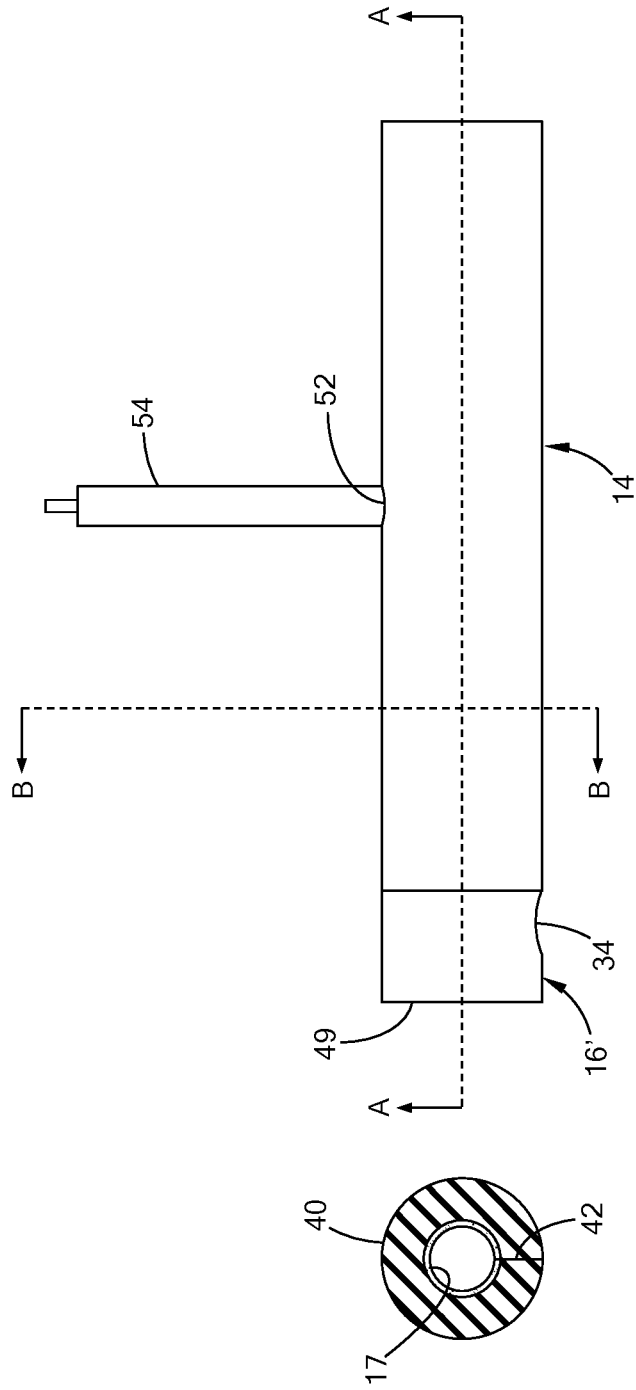

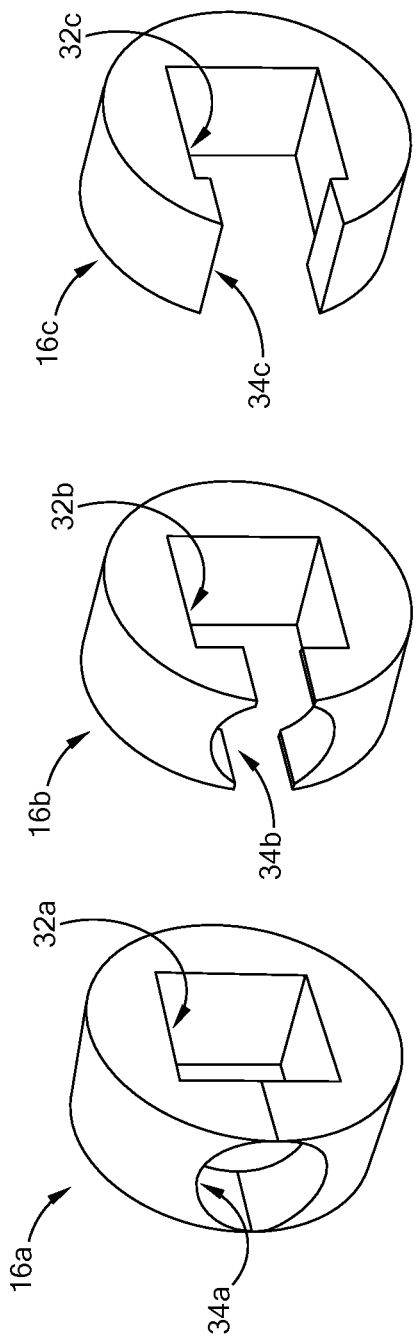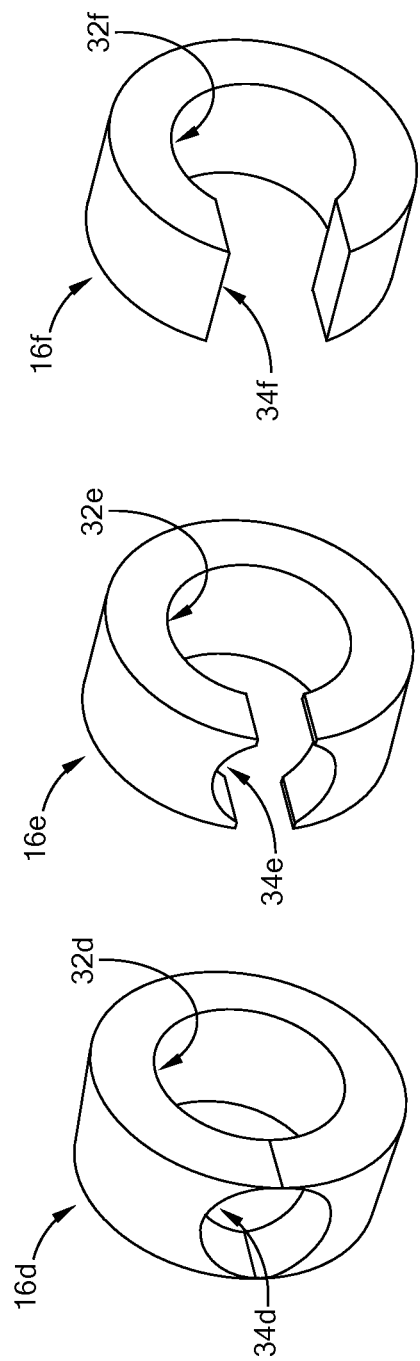

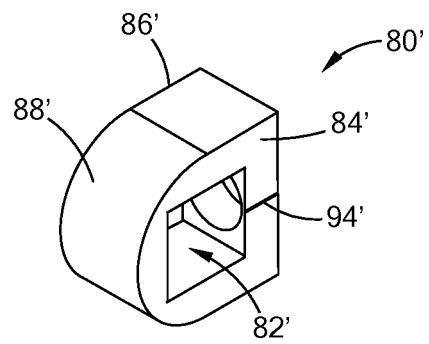
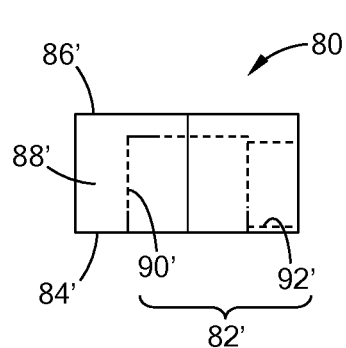
FIG. 12B                FIG. 12A
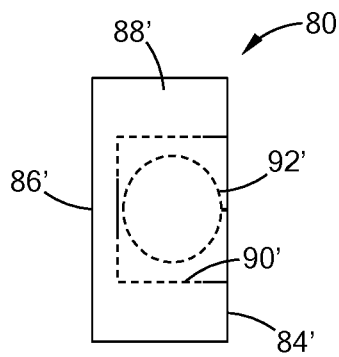
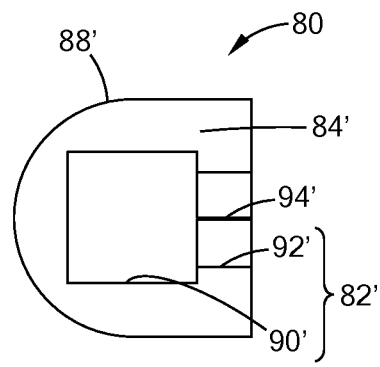
FIG. 12D                FIG. 12C

MODULAR HEATER ASSEMBLIES FOR USE IN FLUID CONDUITS

CROSS-REFERENCE TO RELATED APPLICATION

This application claims priority and the benefit of U.S. Provisional Patent Application No. 63/038,420 filed Jun. 12, 2020. The disclosure of the above application is incorporated herein by reference.

FIELD

The present disclosure relates to heater assemblies for heating fluid conduits, and more particularly to heater assemblies with improved thermal insulation structures for such heated fluid conduits.

BACKGROUND

The statements in this section merely provide background information related to the present disclosure and may not constitute prior art.

The supply of fluids such as oil, gas, and water, among others, from a supply, e.g., an oil well or a water reservoir, requires transfer of such fluids by conduits or the like. The fluids in the conduits may need to be maintained at or above a certain temperature in order to maintain a free or unrestricted flow of the fluids within the conduits. The fluids may be heated by an electric heater, such as a heat trace type, mounted around the conduits. A thermal insulation jacket is generally mounted around the conduits and the electric heater to reduce heat loss to the surrounding environment.

Generally, fittings are used to join the conduits along their length or to join the conduits to form an angle. When sections of conduits are joined at the fittings, the thermal insulation structure around these fittings are generally custom-designed, resulting in increased manufacturing costs.

SUMMARY

This section provides a general summary of the disclosure and is not a comprehensive disclosure of its full scope or all of its features.

In one form of the present disclosure, a modular heater assembly for a fluid conduit system is provided, which includes a plurality of resistive heaters disposed along conduits of the fluid conduit system, a plurality of insulation members disposed around each of the plurality of resistive heaters, and at least one insulation block disposed around a fitting. The fitting is configured to join at least two adjacent sections of the conduits of the fluid conduit system and defines an exterior geometric profile. The insulation block includes a central recess and a peripheral aperture. The central recess defines an internal geometric profile substantially matching the external geometric profile of the fitting. The central recess extends axially in a direction of one of the at least two adjacent sections of conduit. The peripheral aperture defines an internal geometric profile substantially matching an external geometric profile of another of the at least two adjacent sections of the conduits. The peripheral aperture is open to the central recess and extend in a second direction relative to the central recess. The peripheral aperture extends through a sidewall of the insulation block and is axially aligned with the another of the at least two adjacent sections of conduit.

In one variation, the internal geometric profile of the central recess is square or arcuate, such as a cylinder. The central recess may be blind or extend through an entire thickness of the insulation block. The internal geometric profile of the peripheral aperture is arcuate, such as a cylinder.

In other features, the internal geometric profile of the central recess or the peripheral aperture defines opposed, spaced-apart planar surfaces or opposed, spaced-apart arcuate surfaces. The insulation block may include an angled end surface or may include a circular cross-section. In one variation, the insulation block may include a D-shaped cross-section. At least one of the internal geometric profiles of the central recess and the peripheral aperture includes an insulating material. The plurality of resistive heaters are silicone-rubber heaters. Each of the plurality of insulation members include flexible cylindrical foam body. At least one of the flexible cylindrical foam bodies defines a slit along its length.

In another variation, the modular heater assembly further includes at least one heater disposed proximate at least one of the internal geometric profiles of the central recess and the peripheral aperture, and at least one sensor disposed proximate at least one of the internal geometric profiles of the central recess and the peripheral aperture. In one form, the at least one sensor is a temperature sensor.

In still another variation, the central recess and the peripheral aperture define an interior cavity, the interior cavity being open to at least two sides of the insulation block. The interior cavity is open to three sides of the insulation block to define a tee configuration.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a perspective view of a variant of a modular heater assembly mounted around a fluid conduit system and constructed in accordance with the teachings of the present disclosure;

FIG. 6A is a perspective view of portion A of FIG. 5;

FIG. 6B is a front view of portion A of FIG. 5;

FIG. 6C is a cross-sectional view of portion A, taken along line A-A of FIG. 6B;

FIG. 6D is a cross-sectional view of portion A, taken along line B-B of FIG. 6B;

FIG. 7 is a perspective cross-sectional view of an insulation block as shown in portion B of FIG. 6A, wherein the insulation block is viewed from a side opposite to a closed end surface of the insulation block;

FIGS. 10A to 10F are perspective views of insulation blocks having different interior cavities in a generally tee ("T") configuration defined by a central recess and a peripheral aperture, wherein:

FIG. 10A shows an insulation block having a square/rectangular central recess and a cylindrical peripheral aperture;

FIG. 10B shows an insulation block having a square/rectangular central recess and a peripheral aperture defined by opposing, spaced-apart curved surfaces;

FIG. 10C shows an insulation block having a square/rectangular central recess and a peripheral aperture defined by opposing, spaced-apart flat surfaces;

FIG. 10D shows an insulation block having a cylindrical central recess and a cylindrical peripheral aperture;

FIG. 10E shows an insulation block having a cylindrical central recess and a peripheral aperture defined by opposing, spaced-apart curved surfaces;

FIG. 10F shows an insulation block having a cylindrical central recess and a peripheral aperture defined by opposing, spaced-apart flat surfaces;

FIG. 12A is a perspective view of still another variant of an insulation constructed in accordance with teachings of the present disclosure, wherein the insulation block has a D-shaped outer profile and an interior cavity open through only two sides of the insulation block to define a generally "L" interior cavity;

FIG. 12B is a top view of the insulation block of FIG. 12A;

FIG. 12C is a front view of the insulation block of FIG. 12A;

FIG. 12D is a side view of the insulation block of FIG. 12A;

Figure 1:
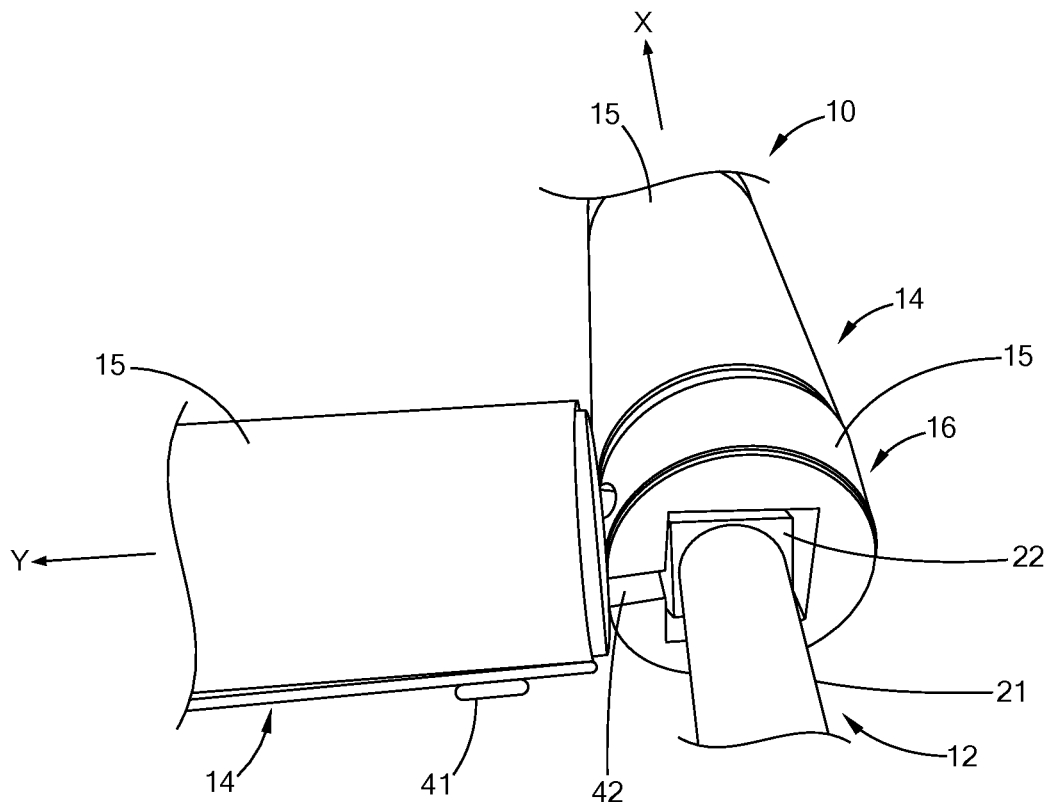
FIG. 1 is a perspective view of a modular heater assembly mounted around a fluid conduit system and constructed in accordance with the teachings of the present disclosure.
Figure 11B:
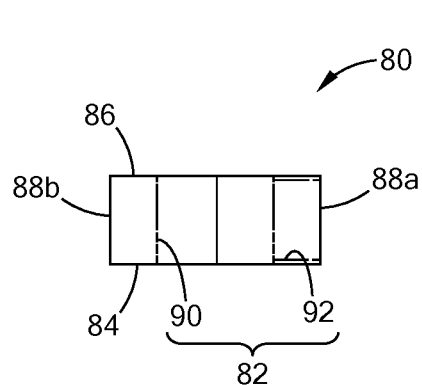
FIG. 11B is a top view of the insulation block of FIG. 11A.
Figure 11A:
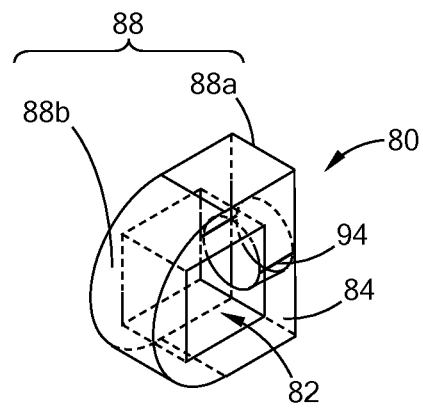
FIG. 11A is a perspective view of another variant of an insulation block constructed in accordance with teachings of the present disclosure, wherein the insulation block has a D-shaped outer profile and an interior cavity open through three sides of the insulation block to define a generally tee ("T") interior cavity.
Figure 11D:
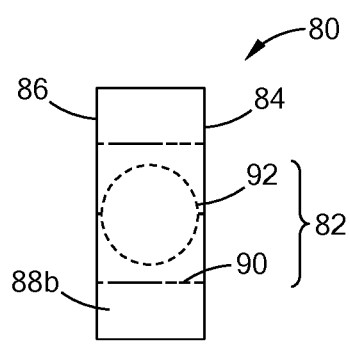
FIG. 11D is a side view of the insulation block of FIG. 11A.
Figure 11C:
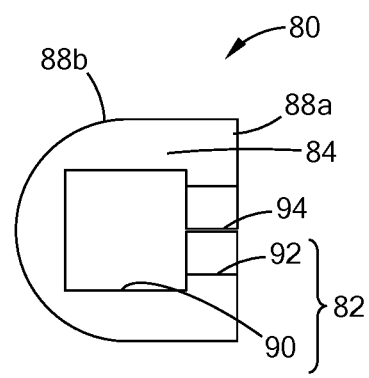
FIG. 11C is a front view of the insulation block of FIG. 11A.
Figure 13:
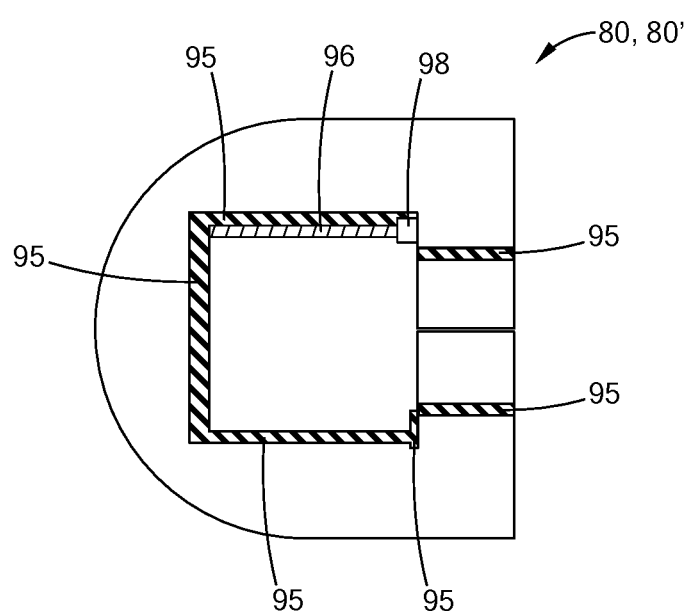
Figure 14:
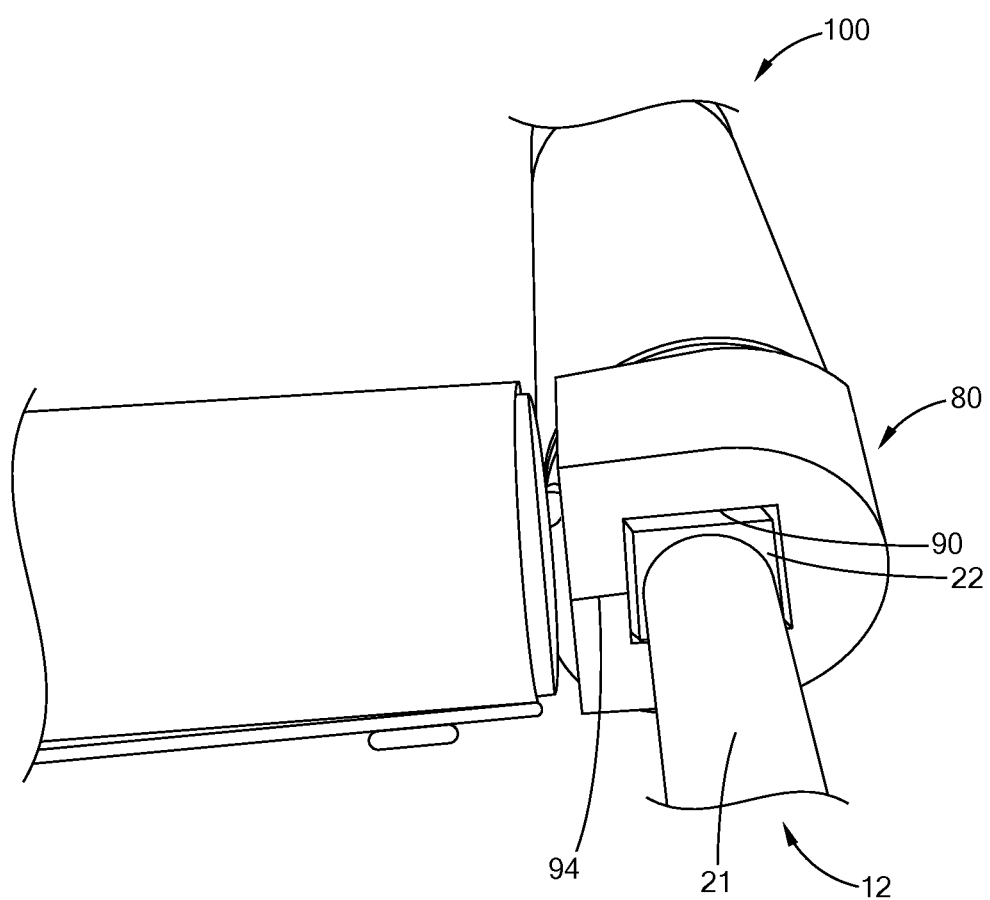

FIG. 13 is a front view of an insulation block with a D-shaped profile, showing an insulating material, an electric heater, and a temperature sensor disposed inside an interior cavity of the insulation block; and FIG. 14 is a perspective view of a modular heater assembly mounted around a fluid conduit system similar to FIG. 1, differing in the use of an insulation block with a D-shaped outer profile as shown in FIGS. 11A to 11B.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
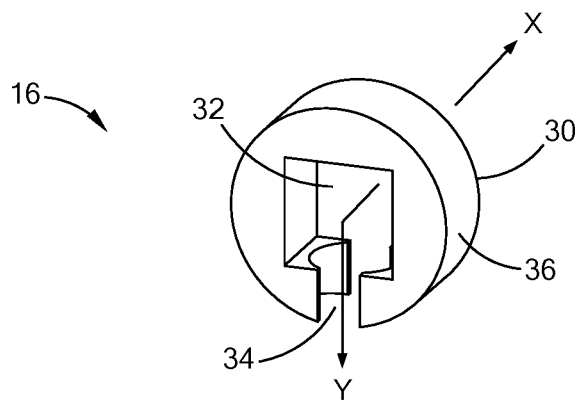
FIG. 2 is a perspective view of an insulation block of the modular heater assembly of FIG. 1.

Referring to FIGS. 1 and 2, a modular heater assembly 10 constructed in accordance with the teachings of the present disclosure is shown. The modular heater assembly 10 includes a plurality of electric heaters 17 (one is shown in FIG. 3B) disposed along conduits of the fluid conduit system 12 to provide heating to the fluid conduit system 12 and a thermal insulation structure (which will be described in more detail below) to provide thermal insulation for the heated fluid conduit system 12. Generally, the fluid conduit system 12 carries a variety of fluids, such as processing gases or liquids, that are to be heated by the modular heater assembly 10 during operation. In one form, the modular heater assembly 10 is a modular silicone rubber gas line heater assembly for heating gas contained in the fluid conduit system 12 for a semiconductor processing system (not shown).

Generally, the fluid conduit system 12 includes a plurality of conduits 18, 20, 21 (shown in FIG. 3 and only conduit 21 being shown in FIG. 1) that are joined by a plurality of fittings 22 to define a plurality of configurations according to applications/needs.

As clearly shown in FIG. 1, the modular heater assembly 10 includes a plurality of elongated sections 14 (only two are shown in FIG. 1) surrounding the conduits 18, 20, 21, and a plurality of insulation blocks 16 (only one is shown in FIG. 1) disposed around the fittings 22. The insulation blocks 16 provide thermal insulation for the fittings 22 and may optionally provide heating to the fitting 22 if an electric heater is mounted around the fitting 22.

Figure 3A:
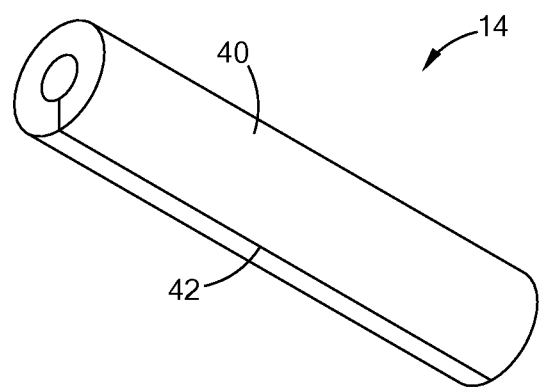
FIG. 3A is a perspective view of an elongated section of the modular heater assembly of FIG. 1.
Figure 3B:
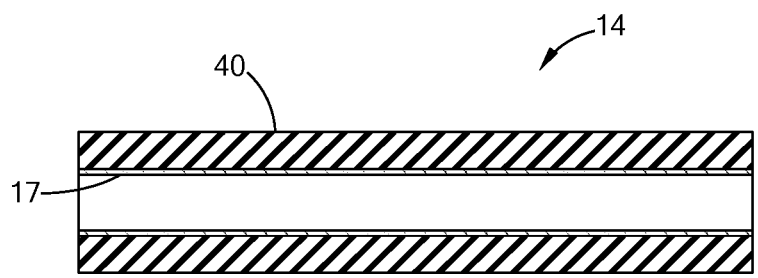
FIG. 3B is a cross-sectional view of the elongated section of FIG. 3A.

Referring to FIGS. 3A and 3B, a portion of one of the elongated sections 14 is shown in greater detail. Each of the elongated sections 14 includes a thermal insulation member 40 having a tubular configuration and an electric heater 17 disposed on an inner surface of the thermal insulation member 40. In one form, the electric heater 17 is a resistive heater. The thermal insulation member 40 may be in the form of a flexible cylindrical foam/sponge body and defines a slit 42 extending along its length to allow the thermal insulation member 40 to be easily mounted around the conduits 18, 20, 21 of the fluid conduit system 12 and self-locked around the conduits 18, 20, 21 of the fluid conduit system 12. The electric heater 17 is attached to an inner surface of the thermal insulation member 40 to form an integral unit. The electric heater 17 may be any type of heating means, such as a heat trace, a heating foil, a silicone rubber heater, etc., and can be attached to an inner surface of the thermal insulation member 40 by any means. In one form, the electric heater 17 is a silicone rubber heater, which is thin, lightweight, and flexible and can fit in applications where space is limited. The silicone rubber heater can be easily attached by an adhesive, such as a silicone-based adhesive, to the inner surface of the thermal insulation member 40. The thermal insulation member 40 is made of a thermal insulation material and may include a silicone-based material. The thermal insulation structure may further include an insulation jacket 15 (shown in FIG. 1) wrapped around the thermal insulation member 40 and held in place by mechanical means such as snaps or hook and loop (i.e., Velcro®) 41. Similarly, the insulation block 16 may also include the insulation jacket 15 as shown.

Figure 4:
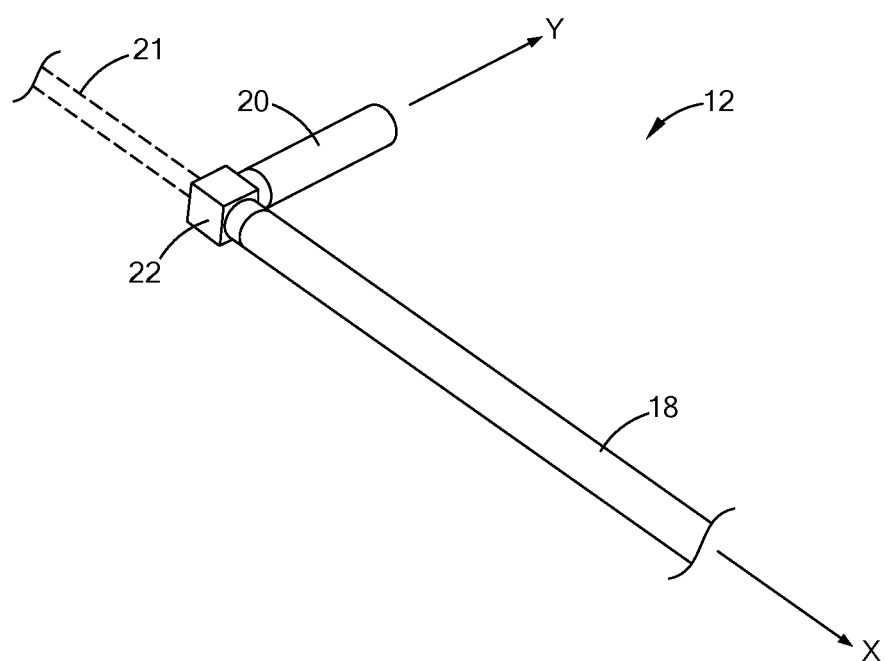
FIG. 4 is a perspective view of a fluid conduit system surrounded by the modular heater system of FIG. 1.

Referring to FIG. 4, the conduit system 12 includes a first conduit 18, a second conduit 20, and a fitting 22 that couples the first conduit 18 to the second conduit 20 to form a right angle. The fluid conduit system 12 may optionally include a third conduit 21 (shown in dashed lines) that is coupled to the first conduit 18 and the second conduit 20 by the fitting 22 and that extends along the length direction of the first conduit 18. The third conduit 21 may be of the same diameter or different diameter of the first conduit 18. The fluid conduit system 12 includes a plurality of fittings 22. One of the fittings 22 may be used to joined adjacent two conduits to form a straight line or to define an angle, such as a right angle as shown in FIG. 4. Another one of the fittings 22 may be used to join adjacent three conduits as shown in FIG. 1. In the exemplary example of FIG. 1, adjacent three conduits are joined by the fitting 22 to define a T-configuration. It should be understood that the teachings of the present disclosure may be applied to any number of conduits and fittings, and connections between conduits and fittings that are at any angle, including a 180° angle (or in other words, a straight section of conduits when transitioning to a smaller or larger diameter, by way of example). Moreover, the fitting 22 does not need to have a square block shape as shown in FIG. 4. Instead, the fitting 22 can be an elbow fitting at 90 degrees or at any angle, or a 3-way fitting depending on the number of conduits being connected.

Referring back to FIG. 1 in conjunction with FIG. 4, the elongated sections 14 have a tubular configuration and are mounted around the first conduit 18, the second conduit 20, and third conduit 21. In FIG. 1, the elongated section 14 for the third conduit 21 is removed to show the interior cavity of the insulation block 16. The inside diameter of the elongated section 14 may be equal to or slightly smaller than the outside diameter of the conduit surrounded by the elongated section 14. In one form, the elongated sections 14 may have an inside diameter between about 0.24 inches (6.096 mm) and about 0.51 inches (19.954 mm). The elongated sections 14 may have the same or different lengths and are mounted around the conduits 18, 20. More than one elongated section 14 may be mounted around the same conduit depending on the length of the conduit. An insulation block 16 is mounted around the fitting 22 to provide thermal insulation for the fitting 22. An electric heater 17 may or may not be provided inside the insulation block 16 depending on applications and needs. Like the thermal insulation member 40 of the elongated section 14, the insulation block 16 is made of a thermal insulation material and may include a silicone-based material. The insulation block 16 has a density between 4 to 16 pounds per cubic foot (64.07 to 256.3 kg/m³).

Referring to FIG. 2, the insulation block 16 has a generally puck-like configuration and includes a puck body 30 defining a central axis X and a peripheral surface 36. The insulation block 16 defines a central recess 32 extending along the central axis X, and a peripheral aperture 34 extending through a side wall and a peripheral surface 36 of the insulation block 16. The peripheral aperture 34 is open to the central recess 32 and extends from the central recess 32 to the outer peripheral surface 36 along the Y-axis, which is perpendicular to the central axis X in this form of the present disclosure. The peripheral aperture 34 is axially aligned with the conduit extending in the Y direction. Therefore, the central recess 32 and the peripheral aperture 34 jointly define an interior cavity in a generally tee ("T") configuration to allow tubing to intersect in a tee configuration. In other words, the interior cavity in a generally tee configuration is open at three sides to allow three conduits (e.g., the first, second, and third conduits 18, 20, 21) to be connected.

The central recess 32 is configured to accommodate the fitting 22 (see FIG. 1) therein and thus may define an internal geometric profile substantially matching the external geometric profile of the fitting 22. The central recess 32 extends axially in a direction of one of the conduits (i.e., the conduit extending in the X direction as shown in FIG. 1). The peripheral aperture 34 defines an internal geometric profile substantially matching an external geometric profile of another one of the conduits (i.e., the conduit extending in the Y direction as shown in FIG. 1). More specifically, the geometric profile of the central recess 32 matches the geometric profile of the fitting 22, which in this exemplary form is square. For example, the central recess 32 may have the same dimensions as those of the outer profile of the fitting 22 or may be slightly larger than the outer profile of the fitting 22 to provide a gap, such as a 0.030" (0.762 mm) gap, to accommodate manufacturing tolerance and for ease of installation when the insulation block 16 is mounted around the fitting 22. The peripheral aperture 34 is configured to accommodate a conduit connected to the fitting 22 and also defines a geometric profile that matches the outer geometric profile of the conduit, which in this form is cylindrical. Similarly, the peripheral aperture 34 may have an inside diameter equal to or slightly larger than the outside diameter of the conduit extending therethrough such that a gap of approximately 0.030" (0.762 mm) is present between the insulation block 16 and the conduit to accommodate manufacturing tolerance and for ease of installation.

For example, the first conduit 18 and the second conduit 20 are connected by the fitting 22 to form a right angle (or any other angle in other forms of the present disclosure). The first conduit 18 extends in a direction parallel to the central axis X of the insulation block 16, and the second conduit 20 may be disposed in the peripheral aperture 34 and extend along the Y-axis. The third conduit 21 is connected to the first conduit 18, is disposed on the other side of the central recess 32 and also extends in a direction parallel to the central axis X of the insulation block 16. As such, the fitting 22 is thermally insulated by the insulation block 16. And since the fittings 22 and the conduits 18, 20, 21 are generally of standard sizes, the insulation blocks 16 and elongated sections 14 can be provided in pre-designed configurations to match the standard sizes of fittings 22 and conduits 18/20/21 to provide a modular and lower cost insulation system.

While the central recess 32 is shown to have a square shape, the central recess 32 may have any shape and size depending on the shape and size of the fitting 22 as long as the fitting 22 can be disposed in the central recess 32. The size of the peripheral aperture 34 depends on the outside diameter/size of the conduit or the combination of the conduit and the electric heater to be disposed in the peripheral aperture 34.

Referring to FIGS. 5 to 7, a variant of a modular heater assembly 50 is shown. The modular heater assembly 50 has a structure similar to that of the modular heater assembly 10 of FIG. 1 except that the insulation block 16' is open at only two sides, instead of three sides, to allow only two conduits to be connected. In addition, the modular heater assembly 50 includes apertures/openings 52 to allow lead wires 54 from heater and sensors to pass through.

FIG. 5 is a perspective view of a variant of the modular heater assembly 50. FIGS. 6A and 6B are a perspective view and a front view of portion A of FIG. 5, respectively. FIGS.

6C and 6D are different cross-sectional views of portion A. FIG. 7 is a perspective view of portion B (i.e., the insulation block 16') of FIG. 6A, wherein the insulation block 16' is viewed from a side opposite to the closed end surface 49 of the insulation block 16'.

When electric heaters and/or sensors (not shown) are mounted around the conduit system 12, provisions for lead wires 54 are needed to connect the heaters/sensors to an external power supply or controller (not shown). The modular heater assembly 50 includes a plurality of apertures/openings 52 to allow the lead wires 54 to pass through. More specifically, the elongated sections 14 include the apertures/openings 52 as shown, however, the apertures/openings 52 may be provided through the insulation block 16' while remaining within the scope of the present disclosure. While FIG. 1 does not show the apertures/openings 52 and the lead wires 54, the apertures/openings 52 and the lead wires 54 can be provided in the modular heater assembly 10 of FIG. 1 to monitor and control the temperature of the modular heater assembly 10 and the conduit system 12 being heated.

FIG. 1 shows the first, second, and third conduits disposed in an X-Y plane and extending in the X direction and the Y direction, whereas FIG. 5 shows the first and second conduits (without a third conduit) are disposed in an X-Z plane and extend in the X direction and the Z direction. Despite the different orientations and the number of the conduits being connected, the same modular heater assembly including the elongated sections 14 and the insulation block(s) 16 can be used to provide heating and thermal insulation for the fluid conduit system 12 by using an insulation block 16' that is suitable for or that can be easily adapted for this particular fluid conduit system. As clearly shown in FIGS. 5 and 6A, the insulation block 16' has a closed end surface 49 such that the central recess 32 allows only one conduit to be inserted therein (i.e., for an elbow fitting). It is understood that the insulation block 16 having a T interior cavity and open at three sides (without the closed end surface 49) for a T fitting can also be used for the fluid conduit system shown in FIG. 5. However, the closed end surface 49 of the insulation block 16' can reduce heat loss from the fitting to the surrounding environment. It is understood that the modular heater assemblies 10, 50 may be used to provide heating and thermal insulation to a fluid conduit system that includes conduits extending in all X, Y, Z directions, among other non-orthogonal directions.

Figure 8:
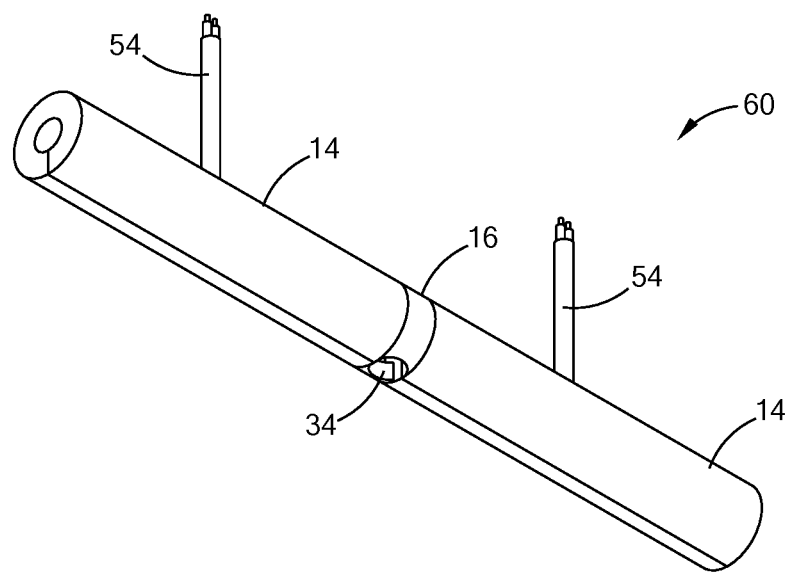
FIG. 8 is a perspective view of another variant of a modular heater assembly mounted around a fluid conduit system and constructed in accordance with the teachings of the present disclosure.

Referring to FIG. 8, another variant of the modular heater assembly 60 is shown. Similar to the modular heater assemblies 10, 50 of FIGS. 1 and 5, the modular heater assembly 60 includes a plurality of elongated sections 14 and a plurality of insulation blocks 16 (only one shown). In this form, the first and second conduits are joined by a fitting (not shown) and are aligned along their lengths. Therefore, the elongated sections 14 are aligned along their length and are disposed around the first and second conduits. One insulation block 16 is disposed between adjacent two of the elongated sections 14 to provide thermal insulation for the fitting. The elongated sections 14 may define holes to allow lead wires 54 of the heaters or sensors to pass through, as previously described.

Figure 9:
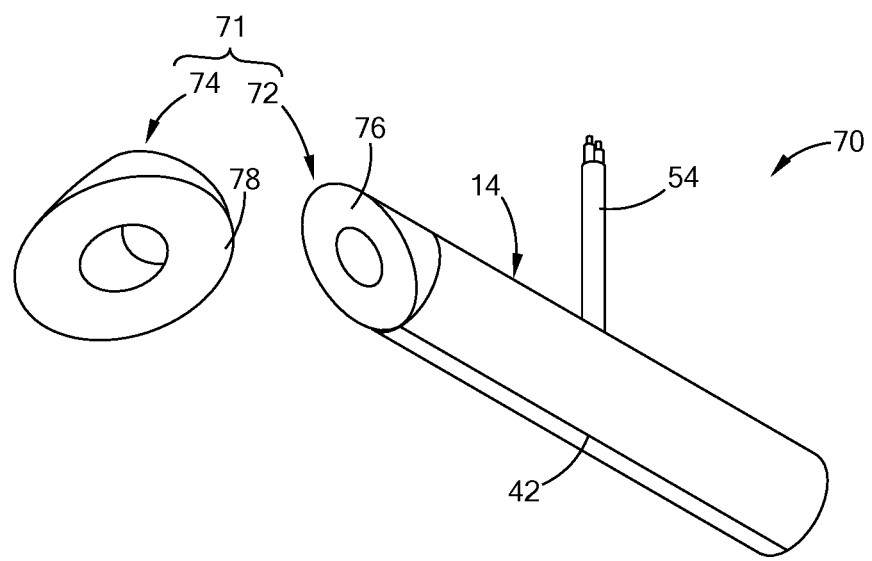
FIG. 9 is a perspective view of another variant of a modular heater assembly mounted around a fluid conduit system and constructed in accordance with the teachings of the present disclosure.

Referring to FIG. 9, another variant of a modular heater assembly 70 constructed in accordance with the teachings of the present disclosure is shown. The modular heater assembly 70 includes an elongated section 14, and an insulation block 71. The insulation block 71 includes a first mitered section 72 attached to an end of the elongated section 14, and a second mitered section 74 attached to the first mitered section 72. The elongated section 14 has a structure similar to that of the elongated section 14 as shown in FIGS. 3A and 3B and thus the description thereof is omitted herein for clarity. The first and second mitered sections 72 and 74 include mitered (angled) end surfaces 76, 78 to form a mitered joint. The first mitered section 72 and the second mitered section 74 are disposed at an end of the elongated section 14 and to provide a thermal insulation around a joint where adjacent conduits are connected. The mitered end surfaces 76 and 78 may be configured to have an angle conforming to an angle defined by adjacent conduits being connected. Additionally and similar to the insulation blocks 16, 16' in FIGS. 2 and 6A, the first and second mitered sections 72 and 74 may define a central recess 32 and a peripheral aperture 34 (shown in FIG. 2) such that a fitting may be disposed inside the first and second mitered sections 72, 74.

It is understood that the first mitered section 72 or the second mitered sections 74 may be integrally formed with an adjacent elongated section 14 to become a one-piece component without departing from the scope of the present disclosure. Alternatively, the first mitered section 72 and the second mitered sections 74 may be individually used as an insulation block without mating with another mitered section.

Referring to FIGS. 10A to 10F, the insulation blocks 16a, 16b, 16d, 16e, 16f may have different interior cavities to accommodate fittings of different geometries. Each of the interior cavities is in a generally tee-configuration and includes a central recess 32a, 32b, 32d, 32e, or 32f, and a peripheral aperture 34a, 34b, 34c, 34d, 34e or 34f of different shapes and/or sizes. In FIG. 10A, the insulation block 16a has a square/rectangular central recess 32a and a cylindrical peripheral aperture 34a. In FIG. 10B, the insulation block 16b has a square/rectangular central recess 32b and a peripheral aperture 34b defined by opposing, spaced-apart curved surfaces. In FIG. 10C, the insulation block 16c has a square/rectangular central recess 32c and a peripheral aperture 34c defined by opposing, spaced-apart flat surfaces. In FIG. 10D, the insulation block 16d has a cylindrical central recess 32d and a cylindrical peripheral aperture 34d. In FIG. 10E, the insulation block 16e has a cylindrical central recess 32e and a peripheral aperture 34e defined by opposing, spaced-apart curved surfaces. In FIG. 10F, the insulation block 16f has a cylindrical central recess 32f and a peripheral aperture 34f defined by opposing, spaced-apart flat surfaces.

While not shown in the drawings, it is understood that the various insulation blocks 16a, 16b, 16c, 16d, 16e, 16f may be modified to provide an interior cavity open at four sides by further forming a second peripheral aperture through the wall of the insulation blocks opposite to the peripheral aperture 34a, 34b, 34c, 34d, 34e, 34f. The various insulation blocks 16a, 16b, 16c, 16d, 16e, 16f may also be modified to provide an interior cavity open at only two sides by forming a closed end surface at an end of the central recess 32a, 32b, 32c, 32d, 32e, 32f.

Referring to FIGS. 11A to 11D, a variant of an insulation block 80 for mounting around a fitting 22 is shown to have a D-shaped outer profile/cross section and an interior cavity 82 open at three sides to define a generally tee ("T") interior cavity. More specifically, the insulation block 80 includes opposing main surfaces 84, 86 (i.e., front and back surfaces) each having a D-shaped peripheral edge, and a peripheral surface 88 connecting the D-shaped peripheral edges of the opposing main surfaces 84, 86. The peripheral surface 88 includes a flat surface portion 88a and a curved surface portion 88b, which jointly define a D shape. The interior cavity 82 includes a central recess 90 extending through the opposing main surfaces 84, 86, and a peripheral aperture 92 open to the central recess 90 and extending through the peripheral surface 88, particularly, the flat surface portion 88a of the insulation block 80. In other words, the central recess 90 extends through an entire thickness of the insulation block 80, which is the distance between the opposing main surfaces 84, 86. The insulation block 80 defines a slit 94. The slit 94 splits the portion of the insulation block 80 that defines the peripheral aperture 92 into halves such that the insulation block 80 can be easily mounted and self-locked around the fitting 22 of the fluid conduit system 12.

The central recess 90 defines an internal geometric profile substantially matching the external geometric profile of the fitting 22. The peripheral aperture 92 defines an internal geometric profile substantially matching an external geometric profile of a conduit inserted into the peripheral aperture 92 and connected to the fitting 22. In the exemplary example shown in FIGS. 11A to 11D, the internal geometric profile of the central recess 90 is square, and the internal geometric profile of the peripheral aperture 92 is arcuate, particularly a cylinder. Therefore, the internal geometric profile of the central recess 90 defines opposed spaced-apart planar surfaces, and the internal geometric profile of the peripheral aperture 92 defines opposed spaced-apart arcuate surfaces (spaced apart by the slit 94). The insulation block 80 provides thermal insulation for a fitting 22 that can join two or three conduits. The T-shape interior cavity also allows for easy access to the interior of the insulation block 80, for example, for installation of a temperature sensor therein. The temperature sensor may be disposed in the central recess 90 or the peripheral aperture 92.

Referring to FIGS. 12A to 12D, another variant of an insulation block 80' is structurally similar to the insulation block 80 of FIGS. 11A to 11D except for the configuration of the interior cavity. Therefore, like reference numbers will be used to designate like components and the detailed description thereof is omitted herein for clarity.

Similarly, the insulation block 80' includes opposing main surfaces 84', 86' and a peripheral surface 88'. The interior cavity 82' is open through only two sides of the insulation block 80' to define a generally "L" interior cavity. The interior cavity 82' includes a central recess 90' and a peripheral aperture 92' open to the central recess 90' and extending through the peripheral surface 88'. Unlike the central recess 90' of FIGS. 11A to 11D, the central recess 90' extends through only one (e.g., the front surface) of the main surfaces 84', 86' and the other one (e.g., the back surface) of the main surfaces 84', 86' is closed end surface. Therefore, the central recess 90' is a blind recess. The insulation block 80' defines a slit 94' that splits the portion of the insulation block 80' surrounding the peripheral aperture 92' into halves to allow the insulation block 80' to be easily mounted and self-locked around the fitting 22 of the fluid conduit system 12.

Similarly, the central recess 90' defines an internal geometric profile substantially matching the external geometric profile of the fitting 22. The peripheral aperture 92' defines an internal geometric profile substantially matching an external geometric profile of a conduit inserted into the peripheral aperture 92' and connected to the fitting 22. In the exemplary example shown in FIGS. 12A to 12D, the internal geometric profile of the central recess 90' is square, and the internal geometric profile of the peripheral aperture 92' is arcuate, particularly a cylinder. The insulation block 80' of FIGS. 12A to 12D with a closed end surface provides an improved thermal insulation for a fitting that joins only two conduits.

Referring to FIG. 13, the insulation blocks 80, 80' as shown in FIGS. 11A to 11D and 12A to 12D may further include an insulating material 95 on an inner surface of the insulation block 80, 80' that defines the interior cavity 82, 82' to provide further thermal insulation. As an example, the insulating material 95 may be a coating applied on the internal geometric profiles of the central recess 90, 90' and/or the peripheral aperture 92, 92'. The coating may be an RF coating, a reflective coating, an aerogel coating or any coating known in the art to provide improve thermal insulation. Optionally, one or more electric heaters 96, and/or one or more temperature sensors 98 may be provided in the central recess 90, 90' and/or the peripheral aperture 92, 92' of the interior cavity 82, 82' for improved heating control and monitoring. It is understood that while the insulating material 95, the electric heater 96 and the temperature sensor 98 are described in connection with the insulation blocks 80, 80 with a D-shaped outer profile, they can be used in any of the insulation blocks 16, 16', 16a, 16b, 16c, 16d, 16e, 16f, 71, 72, 74 previously described in connection with FIGS. 1 to 10.

Referring to FIG. 14, a modular heater assembly 100 including an insulation block 80 having a D-shaped outer profile is shown to be mounted around a fluid conduit system 12. The modular heater assembly 100 is structurally similar to the modular heater assembly 10 of FIG. 1 except that an insulation block 80 with a D-shaped outer profile as shown in FIGS. 11A to 11B is used. It is understood that the insulation block 80' with a closed end surface as shown in FIGS. 12A to 12B can also be used in the modular heater assembly 100 if the fitting 22 is used to join only two conduits at an angle. As shown, the insulation block with a D-shaped outer profile provides improved mating with the portion of the conduit that is inserted into the peripheral aperture (i.e., the portion of the conduit disposed proximate the slit 94 of the insulation block 80). The insulation block with a D-shaped outer profile has more materials present above and below the slit 94 so that the gap of the slit 94 can be more easily reduced after the conduit is inserted into the peripheral aperture 92.

In summary, a modular heater assembly 10, 50, 60, 70, or 100 includes a plurality of heating/insulating sections, including elongated sections 14, insulation blocks 16, 16', 16a, 16b, 16c, 16d, 16e, 16f, 71, 72, 74, 80, 80'. These heating/insulating sections may have different lengths and sizes and may be combined in a variety of ways depending on the structure of the conduit system 12 and the size of the conduits 18, 20, 21. The insulation blocks 16, 16', 16a, 16b, 16c, 16d, 16e, 16f, 71, 72, 74, 80, 80' may be configured to have different interior cavities that are open at two sides, three sides, or four sides or that have a central recess and a peripheral aperture open to the central recess at different angles to accommodate fittings of different configurations. Therefore, the modular heater assembly according to the teachings of the present disclosure can be easily adapted to a fluid conduit system 12 by choosing an insulation block having a conforming interior cavity without any custom-made components and can provide a relatively low cost thermal insulation structure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A modular heater assembly for a fluid conduit system, the modular heater assembly comprising:
   a plurality of resistive heaters disposed along conduits of the fluid conduit system;
   a plurality of insulation members disposed around each of the plurality of resistive heaters; and
   at least one insulation block disposed around a fitting, the fitting configured to join at least two adjacent sections of the conduits of the fluid conduit system and defining an exterior geometric profile, the insulation block comprising:
      opposing main surfaces perpendicular to an axial direction of one of the at least two adjacent sections of the conduits,
      a central recess defining an internal geometric profile substantially matching the external geometric profile of the fitting, the central recess extending axially in an axial direction of the one of the at least two adjacent sections of the conduits and extending through at least one of the opposing main surfaces; and
      a peripheral aperture defining an internal geometric profile substantially matching an external geometric profile of another of the at least two adjacent sections of the conduits, the peripheral aperture being open to the central recess and extending in an axial direction of the another of the at least two adjacent sections of the conduits, wherein the peripheral aperture extends through a sidewall of the insulation block and is axially aligned with the another of the at least two adjacent sections of the conduits.

2. The modular heater assembly according to claim 1, wherein the internal geometric profile of the central recess is square.

3. The modular heater assembly according to claim 1, wherein the internal geometric profile of the central recess is arcuate.

4. The modular heater assembly according to claim 3, wherein the internal geometric profile comprises a cylinder.

5. The modular heater assembly according to claim 1, wherein the central recess is blind.

6. The modular heater assembly according to claim 1, wherein the central recess extends through an entire thickness of the insulation block such that central recess extends through both the opposing main surfaces.

7. The modular heater assembly according to claim 1, wherein the internal geometric profile of the peripheral aperture is arcuate.

8. The modular heater assembly according to claim 7, wherein the internal geometric profile comprises a cylinder.

9. The modular heater assembly according to claim 1, wherein the internal geometric profile of the central recess defines opposed, spaced-apart planar surfaces.

10. The modular heater assembly according to claim 1, wherein the internal geometric profile of the peripheral aperture defines opposed, spaced-apart arcuate surfaces.

11. The modular heater assembly according to claim 1, wherein the insulation block comprises an angled end surface.

12. The modular heater assembly according to claim 1, wherein the insulation block comprises a circular cross-section.

13. The modular heater assembly according to claim 1, wherein the insulation block comprises a D-shaped cross-section.

14. The modular heater assembly according to claim 1, wherein at least one of the internal geometric profiles of the central recess and the peripheral aperture comprises an insulating material.

15. The modular heater assembly according to claim 1, further comprising at least one heater disposed proximate at least one of the internal geometric profiles of the central recess and the peripheral aperture.

16. The modular heater assembly according to claim 1, further comprising at least one sensor disposed proximate at least one of the internal geometric profiles of the central recess and the peripheral aperture.

17. The modular heater assembly according to claim 16, wherein the at least one sensor is a temperature sensor.

18. The modular heater assembly according to claim 1, wherein each of the plurality of insulation members comprise a flexible cylindrical foam body.

19. The modular heater assembly according to claim 18, wherein at least one of the flexible cylindrical foam bodies defines a slit along its length.

20. The modular heater assembly according to claim 1, wherein the plurality of resistive heaters are silicone-rubber heaters.

21. The modular heater assembly according to claim 1, wherein the central recess and the peripheral aperture define an interior cavity, the interior cavity being open to at least two sides of the insulation block.

22. The modular heater assembly according to claim 21, wherein the interior cavity is open to three sides of the insulation block to define a tee configuration.

* * * * *